United States Patent [19]

Ii et al.

[11] 3,868,172

[45] Feb. 25, 1975

[54] MULTI-LAYER FERROELECTRIC APPARATUS

[75] Inventors: Lawrence B. Ii; David C. T. Shang, both of Apalachin, N.Y.

[73] Assignee: International Business Machines Corporation, Armonk, N.Y.

[22] Filed: June 18, 1973

[21] Appl. No.: 371,224

[52] U.S. Cl. .................. 350/150, 350/158, 350/160

[51] Int. Cl. .............................................. G02f 1/26

[58] Field of Search ........... 350/147, 150, 151, 158, 350/160 R, DIG. 2; 356/112

[56] References Cited

UNITED STATES PATENTS

| | | | |
|---|---|---|---|
| 3,341,274 | 9/1967 | Marks | 350/160 |
| 3,499,700 | 3/1970 | Harris | 350/150 |
| 3,592,527 | 7/1971 | Conners | 350/150 |
| 3,661,442 | 5/1972 | Kumada | 350/150 |

*Primary Examiner*—Ronald L. Wibert
*Assistant Examiner*—Michael J. Tokar
*Attorney, Agent, or Firm*—Norman R. Bardales

[57] ABSTRACT

Ferroelectric optical apparatus has a selectably variable spectral bandpass characteristic. The apparatus has ferroelectric multilayers interleaved with non-opaque selectively energizable conductors for this purpose. The apparatus has low voltage switching characteristics. Light filter and optical storage devices of the invention are also disclosed.

8 Claims, 16 Drawing Figures

MULTI-LAYER FERROELECTRIC APPARATUS

CROSS-REFERENCES TO RELATED APPLICATIONS

In the U.S. Pat. application, Ser. No. 371,227, which is incorporated herein by reference, of Lawrence Cooper and the two co-inventors herein, Lawrence B. Ii and David C. T. Shang, entitled "Multi-Layer Ferroelectric Optical Memory System," filed June 18, 1973 concurrently herewith and assigned to the same Assignee of the present invention, there is shown as a component thereof multi-layer ferroelectric optical storage apparatus which employs the principles of the present invention.

BACKGROUND OF THE INVENTION

1. Field of the Invention

This invention is related to ferroelectric optical devices and, in particular, to ferroelectric optical devices utilized in optical data processing systems.

2. Description of the Prior Art

Optical data processing systems utilizing ferroelectric devices are well known in the art. Heretofore in the prior art, for example, these devices were employed as light switches or memory storage elements. Generally, these prior art devices, however, control the intensity of the light being transmitted through them. In one convention, if light was passed by the device it represented a binary 1, and if no light was passed by the device it represented a binary 0. Thus, the prior art devices processed the information in pure binary form for any given storage location and hence, were not conducive to transmitting the information in other digital forms. In addition, these prior art devices had a fixed or constant spectral bandpass characteristic.

It has been recognized in the prior art that fine-grained ceramic ferroelectric devices possess multi-color display capabilities when illuminated with white, linearly polarized light. In addition, it is known that optical retardation is a function of electrical poling and electrical field in a ferroelectric fine-grained ceramic device. More specifically, the prior art recognizes that optical retardation Γ for a plate thickness t is defined as $\overline{\Delta n}t$, where $\overline{\Delta n}$ is defined as effective birefringence. The dependence of the retardation on electrical poling means that the intensity of chromatic light, which is transmitted through an optical network or system consisting of a polarizer, the ceramic plate, and an analyzer, depends on the magnitude of electrical poling and the direction of the ceramic polar axis. For incident white light, the dominant wavelength transmitted by the system also depends on the same parameters, cf. "Ferroelectric Ceramic Electrooptic Materials and Devices," C. E. Land and P. D. Thacher, Proceedings of the IEEE, Vol. 57, No. 5, May 1969, pp. 751–768, and in particular pages 752 and 757. In these prior art devices the dominant wavelength transmitted thereby is fixed or constant for the particular given device, i.e. for a given thickness and voltage level. To change the wavelength, the voltage level is changed accordingly in these devices. However, this effects only a limited change in the effective birefringence, and hence, only a corresponding limited change in the dominant wavelength. Moreover, if these devices were of the type where the voltage is applied across the optical axis, the change occurs in a confined region of the device between the energizing conductors.

Moreover, in certain cases the ferroelectric devices of the prior art were of the bulk type. The use of bulk ferroelectric devices requires high switching voltages. For example, in the publication entitled "Strain-Biased Ferroelectric-Photoconductor Image Storage and Display Devices," Juan R. Maldonado and Allan H. Meitzler, Proceedings of the IEEE, Vol. 59, No. 3, Mar. 1971, pp. 368–382, typical switching voltages of +220 volts and −100 volts are employed for writing and erasing, respectively, the strain-biased ferro-electric picture device referred to as ferpic and shown in FIG. 7 thereof.

The high voltage switching requirements of these type prior art devices are disadvantageous. It requires high operating voltages with a concomitant increase in power requirements. They create potential hazardous conditions in operation and maintenance due to the high potentials. Moreover, the use of such high voltage potentials is not compatible or conductive to use of such prior art devices with the relatively lower voltage potentials used in integrated circuit technology such as, for example CMOS and the like.

SUMMARY OF THE INVENTION

An object of this invention is to provide ferroelectric optical apparatus having a selectable variable spectral bandpass characteristic.

Another object of this invention is to provide ferroelectric optical apparatus having low voltage switching characteristics.

Another object of this invention is to provide ferroelectric optical apparatus which is economical to operate and/or is relatively safe.

Still another object of this invention is to provide ferroelectric optical apparatus of the light filter type that has a selectable variable visible bandpass characteristic.

Still another object of this invention is to provide ferroelectric optical apparatus of the storage type that has a selectable variable spectral bandpass characteristic for storing the optical data in digital form for each storage location.

Still another object of this invention is to provide ferroelectric optical devices for optical data processing systems.

According to one aspect of the invention, a ferroelectric optical apparatus, which is to be subjected to incident linearly polarized white light, is comprised of a plurality of spaced conductive member means, and a plurality of ferroelectric member means which are interleaved between the conductive member means. Selective energizing means selectively energizes the plurality of conductive member means to provide the apparatus with a selectable variable spectral bandpass characteristic.

The foregoing and other objects, features, and advantages of the invention will be apparent from the following more particular description of the preferred embodiments of the invention as illustrated in the accompanying drawing.

BRIEF DESCRIPTION OF THE DRAWING

In the Figures, like elements are designated with similar reference numerals.

DESCRIPTION OF THE PREFERRED EMBODIMENTS

First will be described a preferred manner for fabricating the multi-layered ferroelectric optical apparatus of the present invention.

Figure 1:
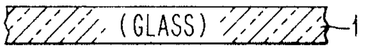
FIGS. 1 – 4 are common partial cross-sectional views of ferroelectric optical apparatus of two preferred embodiments associated with FIGS. 5A–5D and 6A–6B, respectively, of the present invention at various initial stages of their formation.

The ferroelectric apparatus of the present invention is preferably fabricated using thin film techniques. Accordingly, as shown in FIG. 1, a transparent substrate 1 such as glass or mica is provided with a suitable thickness, e.g. 10 to 15 mils.

Figure 2:
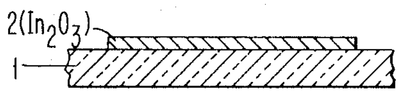

Referring to FIG. 2, a transparent conductive member means 2 is applied to the substrate 1. For the particular embodiment of FIG. 2, means 2 is shown as a contiguous transparent conductive layer of metal such as, for example, $In_2O_3$. Layer 2 is preferably affixed to the substrate 1 by an appropriate sputtering or by a chemical vapor deposition technique to a thickness of, for example, 500 to 1,500 Angstroms approximately. For the embodiments associated with FIG. 2, the conductive member means 2 is comprised exclusively of a conductive member having a substantially constant impedance. It should be understood, however, that the conductive member means 2 may alternatively also include a second conductive member which has an impedance characteristic responsive to light, such as a photoconductive layer. The photoconductive member in such cases is affixed preferably to the constant impedance conductive member also by a sputtering or chemical vapor deposition techniques.

Figure 3:
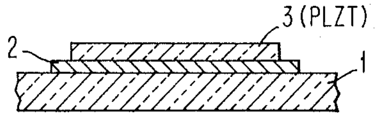

Referring now to FIG. 3, the first layer 3 of a suitable ferroelectric material such as, for example, the type referred to in the art as PLZT, which is lead-zirconate titanate doped with lanthanum, is applied to the exposed surface of the conductive member means 2. Preferably the layer 3 is affixed to means 2 by sputtering or chemical vapor deposition techniques. The thickness of the layer 3 is judiciously selected to be compatible with the bandpass spectral range desired for the particular apparatus being fabricated.

By way of example, the thickness of layer 3 is approximately in the order of about 8 microns, i.e. $8 \times 10^4$ Angstroms. Layer 3 is preferably fabricated by mutually successively built up sub-layers of the ferroelectric material using successive sputtering or chemical vapor deposition techniques to the desired thickness. The thickness of each sublayer is in the order of approximately one micron and more preferably is in the sub-micron thickness range.

Figure 4:
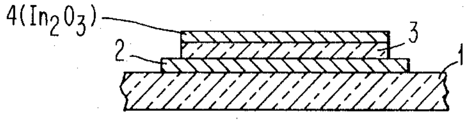

Referring now to FIG. 4, a second transparent conductive means 4 is next applied to the exposed surface of the layer 3. As shown in FIG. 4, the second conductive member means 4 is also preferably a contiguous layer of metal such as the aforementioned $In_2O_3$ and is of the same approximate thickness as the layer 2. As a result, at the end of the fabrication stage of FIG. 4, there is provided a first section of the device which comprises the ferroelectric layer 3 and the two conductive member means 2 and 4 between which layer 3 is interleaved. As contemplated by the invention, additional sections of ferroelectric layers and interleaving conductive member means are provided, as will be explained with reference to the two embodiments of FIGS. 5A–5D and FIGS. 6A–6B, respectively.

In the embodiment of FIGS. 5A–5D, the sections are insulated with respect to each other. Accordingly, a transparent insulator member means 5 such as, for example, a layer of quartz, i.e. $SiO_2$, is provided between the conductive member means 4 and the next section of the device to be formed. The insulator layer 5 is applied preferably again by sputtering or chemical vapor deposition techniques with a thickness of approximately less than 1 micron and preferably above 0.2 to 0.5 microns.

Figure 5A:
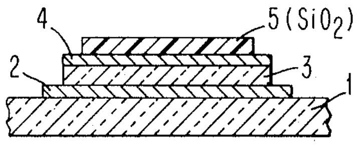
FIGS. 5A – 5D are partial cross-sectional views of one of the two aforementioned preferred embodiments of the apparatus of the present invention at various stages of its fabrication subsequent to the stages of FIGS. 1 – 4.
Figure 5B:
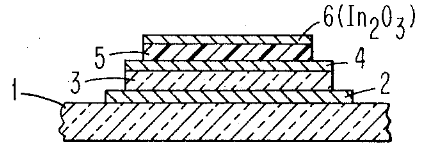
Figure 5C:
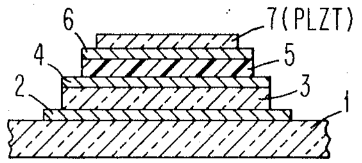
Figure 5D:
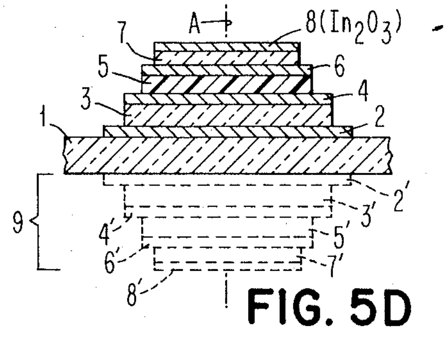

In turn, conductive member means 6, the ferroelectric layer 7, and the conductive member means 8 of the next section of the device are successively affixed to the insulator 5, means 6, and means 7, respectively, by successive sputtering or chemical vapor deposition techniques, cf. FIGS. 5B–5D. As a result, the embodiment of FIG. 5D has a plurality of space conductive member means 2 and 4, 6 and 8, which are interleaved by a plurality of ferroelectric member means 3 and 7, respectively. More particularly, in the two section embodiment of FIG. 5D, the section comprising the elements 2 to 4 is separated from the next adjacent section comprising the elements 5 to 7 by the insulator 5. Thus, each of the aforementioned sections has its own pair of mutually exclusive member means 2, 4 and 6, 8, which function as electrodes for their respective associated ferroelectric layers 3, 7.

Figure 6A:
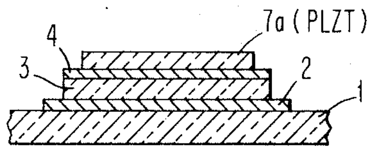
FIGS. 6A – 6B are partial cross-sectional views of the other of the two aforementioned preferred embodiments of the apparatus of the present invention at various stages of its fabrication subsequent to the stages of FIGS. 1 – 4.
Figure 6B:
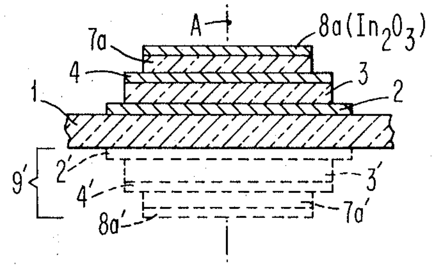

In the two section embodiment of FIGS. 6A–6B, the adjacent sections utilize a common electrode. Thus, the conductive member means 4 is used as a common electrode by each of the ferroelectric member means 3 and 7*a*. In this manner, the need for an insulator 5 is obviated in the embodiment of FIGS. 6A–6B. As shown in FIG. 6A, the second layer 7*a* of ferroelectric material such as the aforementioned PLZT is applied by sputtering or chemical vapor deposition techniques to the exposed surface of means 4; and as shown in FIG. 6B, a transparent conductive member 8*a* is next applied to the exposed surface of the layer 7*a* by sputtering or chemical vapor deposition techniques.

In the embodiments of FIGS. 5A–5D and 6A-6B, the left and right edges as viewed in the FIGS. of the elements 1–8 are formed in a step-like manner using appropriate masking techniques so as to provide frontal access to the conductive member means 2, 4, 6, 8 or 8*a* as the case might be for the connection thereof of appropriate wire leads, not shown, to each of the last mentioned conductive member means.

It should be understood that in either of the embodiments of FIG. 5D or FIG. 6B, other additional sections of ferroelectric layers and associated conductive member means and/or insulators, as the case might be, may be further built upon the last formed section of each if so desired. It should be also understood that other elements 2'–8', which are shown in phantom outline form 9 in FIG. 5D may be provided on the other surface of the substrate 1 and in registration with their corresponding similar elements 2–8. Likewise, additional elements 2' to 4', 7*a*', 8*a*' similar to and in registration with their counterpart elements 2–4, 7*a*, 8*a*, respectively, may also be provided on the other surface of the substrate 1 of FIG. 6B, as shown therein in phantom outline form 9'.

It should be understood that the number of sections provided in the apparatus of the present invention will determine its selectable spectral bandpass range. Thus, for the example of an 8 micron thickness for each ferroelectric layer, approximately five or six sections would be required to cover the range from blue to red. If on the other hand, only a limited range about blue was required, then only two sections would be needed for the aforementioned thickness example of 8 microns.

It should be understood that during the fabrication of each of the ferroelectric layers, the dipoles thereof are aligned in a direction normal to the optical axis A. This may be accomplished, for example, by using a thermal stress technique. Alternatively, an electrostatic stress has been suggested as a possible way of providing the dipole alignment.

Figure 7:
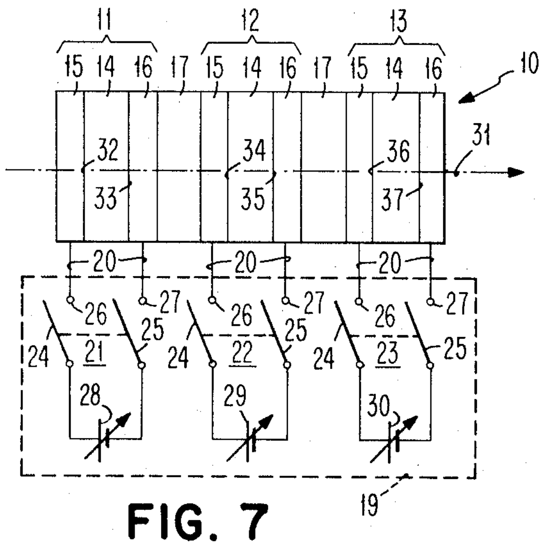
FIG. 7 is a schematic block diagram of another embodiment of the present invention.

Referring now to FIG. 7, there is shown, schematically, a three section embodiment generally indicated by the reference numeral 10. Each of the three sections, which are designated by the reference numerals 11, 12, 13, has a ferroelectric member means 14 which is sandwiched between two transparent conductive member means 15, 16. A pair of insulator member means 17 are provided between the intermediate section 12 and the outer adjacent sections 11, 13 thereto. Device 10 of FIG. 7, is preferably fabricated in a manner similar to the fabrication of the embodiment of FIG. 5D. The device 10 is preferably symmetrical, i.e. has layers 14 of the same material and thickness.

Selectively energizing means 19 are coupled to the input terminals 20 of the electrode conductive member means 15, 16 of sections 11–13. The energizing means 19 is schematically shown for sake of simplicity as having three schematically shown switches 21, 22, and 23. Each of the switches 21–23 is configured as a pair of double pole, single throw, commonly ganged switches 24 and 25 which coact with their associated contacts 26, 27, respectively. Each switch 21, 22, 23 is adapted to connect a variable voltage supply 28, 29, 30, respectively, across the particular electrode means 15, 16 of the sections 11, 12, and 13, respectively. In operation, one or more of the switches 21–23 are selectively operated to energize one or more of the sections 11–13, as will be explained in greater detail hereinafter in conjunction with the description of FIG. 8. In practice, means 11 would use electronic switches such as transistors and the like and compatible selective electronic control means therefor, as is obvious to those skilled in the art.

Figure 8:
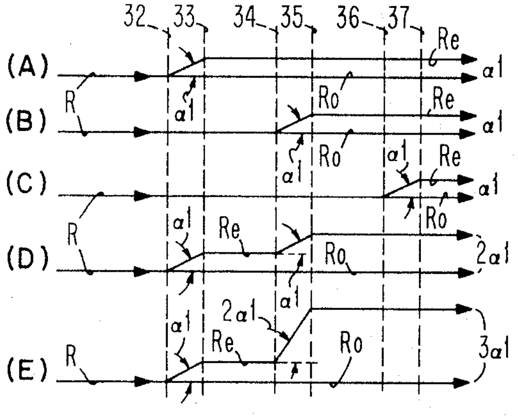
FIG. 8 is a schematic diagram of idealized light trace waveforms passing through the embodiment of FIG. 7 and which is useful in understanding the principles of the present invention.

Referring to FIG. 8, there are shown spatial waveforms representing the transition of linearly polarized ray of light passing through the device 10 in the assumed direction of left to right along the ordinary and extraordinary optical axes 31 thereof. The vertical lines 32–37 correspond to the respective edges 32–37 of the ferroelectric member means 14 of sections 11–13, respectively, shown in FIG. 7.

By way of example, it is assumed that the electric voltage sources 28–30 are each set to the same voltage level. Referring to waveform A, it is assumed that switch 21 is in the closed position and switches 22 and 23 are in their open positions. Under these assumed conditions, when linearly polarized light ray R passes through the ferroelectric member means 14 of section 11, which is selectively energized, a fixed angle $\alpha 1$ of retardation is provided between the ordinary ray Ro and extraordinary ray Re components of ray R, as shown by the waveform A FIG. 8.

Similarly, if the switches 21 and 23 are opened and switch 22 is closed, the linearly polarized light ray R will not be divided into its constituent components R*o*, Re until it passes through the ferroelectric member means 14 of section 12, which is now energized. Under the assumed condition of equal voltage level settings for the sources 28–30, the angle of $\alpha 1$ of retardation associated with the waveform B is the same as that associated with the waveform A.

In a similar manner, if the switch 23 is closed and switches 21 and 22 are opened, then the constituent components, R*o*, R*e* of the linearly polarized light ray R do not occur until the light ray R passes through the medium 14 of section 13, cf. waveform C. Again, for the aforementioned assumed voltage amplitude, the angle of retardation associated with the waveform C is the same as that of waveforms A or B.

By way of example, with respect to the waveform D of FIG. 8, it is assumed that switches 21 and 22 are closed and switch 23 remains open. It is further assumed that the levels of the voltage sources 28 and 29 are not changed and are the same as in the previous assumption used to describe the conditions of waveforms A–C. Accordingly, when the linearly polarized light ray R passes through the ferroelectric member 14 of the first section 11, it again is provided with an angle of retardation equal to $\alpha 1$ between its constituent components R*o* and R*e*. Moreover, when the extraordinary ray component Re passes through the ferroelectric member 14 of the second energized section 12, it is again retarded by an angle equivalent to the angle $\alpha 1$. As a result, when the extraordinary and ordinary R*e*, R*o* emerge from the edge 37, the resultant angle of retardation will be approximately equivalent to the product of $2 \times \alpha 1$.

In the waveform E associated with FIG. 8, it is again assumed that the switches 21 and 22 are closed and that switch 23 is open. It is further assumed that the voltage level of the voltage source 28 is the same as it was for the previous conditions associated with waveforms A–D. By way of example, it is assumed that the voltage level of the voltage source 29 is increased so that the extraordinary ray Re when passing through the ferroelectric layer 14 of the second section 12 is retarded by an angle equal to the product $2 \times \alpha 1$. As a result, when the extraordinary ray Re emerges from the edge 37, it will be at a resultant angle of retardation equivalent to the product 3 × $\alpha 1$ as a result of the retardation it receives from passing through the members 14 of the first and second sections 11 and 12.

Not shown, with the embodiment of FIG. 7, is the polarizer and analyzer elements between which the device 10 is sandwiched in a manner well known to those skilled in the art. The polarizer element provides the linearly polarized light and the analyzer element combines the ordinary and extraordinary rays so that the light emerging therefrom is at a spectral content which is dependent on the magnitude of the resultant angle of retardation. Thus, as shown by the waveforms of A–E of FIG. 8, by selectively energizing the conductive means 15, 16 of the sections 11–13, the device 10 provided with a selectively variable spectral bandpass characteristic.

Figure 9:
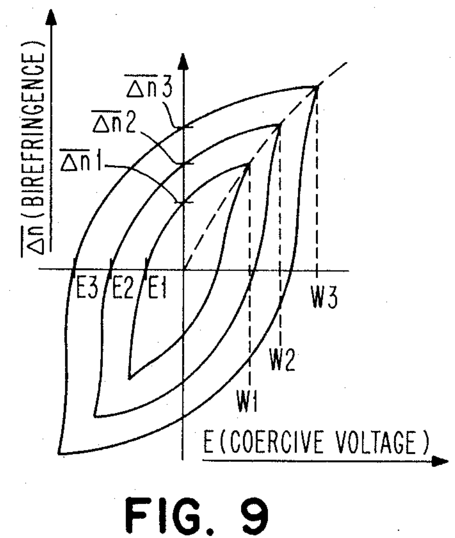
FIG. 9 is another waveform diagram useful in understanding the principles of the present invention.

Referring to FIG. 9, there is shown a family of ferroelectric hysteresis loops as idealized waveforms for three different energization levels W1, W2, W3 associated with a single section of the apparatus of FIG. 7. As is well known to those skilled in the art, the levels W1, W2, W3 produce remnant birefringent levels $\overline{\Delta n}1$, $\overline{\Delta n}2$, $\overline{\Delta n}3$, respectively, that correspond to different angles of retardation $\alpha 1$, $\alpha 2$, $\alpha 3$, respectively.

Figure 11:
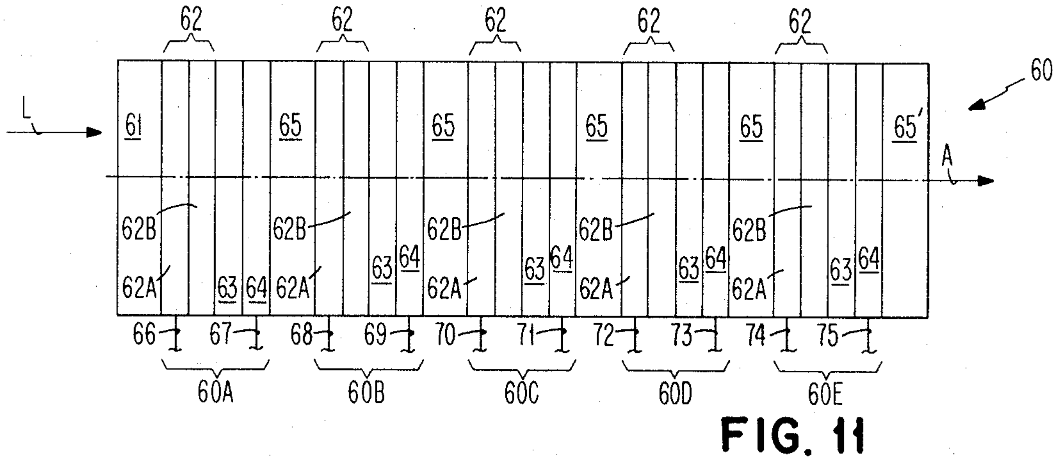
FIG. 11 is a schematic view of still another embodiment of the present invention.
Figure 10:
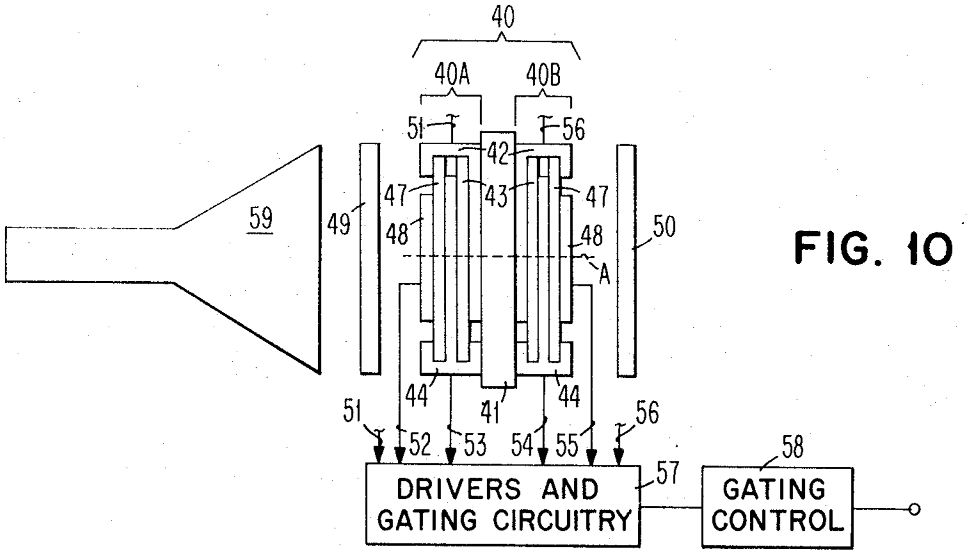
FIG. 10 is a schematic view of still another embodiment of the present invention.

Referring now to FIG. 10, and in greater detail to FIG. 11, there is shown a four section light filter apparatus embodiment 40 of the present invention. It includes a substrate 41 similar to the substrate 1 of FIG. 1. Disposed on each side of the substrate 41 are identically-configured and aligned multi-layer ferroelectrical structures 40A and 40B. Each of the structures 40A 40B has three conductive members or electrodes 42, 44, 48 and two ferroelectric layers 43 and 47 interleaved between their respective associated electrodes 42, 44, 48. Thus, the two sections of a structure 40A or 40B, as the case might be, utilize a common electrode 44 between the two ferroelectric layers 43 and 47 of the particular structure 40A, 40B. The two structures 40A and 40B are on the other hand insulated from each other by the substrate 41. Apparatus 40 also includes optical elements 49 and 50 which are a polarizer and an analyzer, respectively. The electrodes 42, 44 and 48 are connected via the respective leads 51–56 to the output terminals of the voltage driver and gating circuitry indicated schematically by the box 57. Control circuitry 58 contains control logic for selectively actuating the gates, not shown, of the circuitry 57, which in turn selectively energizing the electrodes 42, 44, 48.

In operation, apparatus 40 is juxtaposed to a broadband light source such as a display device, for example, the cathode ray tube, or CRT, 59, shown in FIG. 10. By judiciously selecting the electrodes 42, 44 and 48 to be energized by the voltage drivers of circuitry 57, the light passing through the filter apparatus 40 will have its angle of retardation altered accordingly. Each different angle of retardation represents a particular spectral bandpass, and hence, a different color. Thus, the apparatus 40 of FIG. 10 is capable of providing discrete selectively different multi-color displays of the image appearing in the face of the CRT 59.

Referring now to FIG. 11, there is shown a ferroelectric optical storage apparatus embodiment of the present invention in schematic form, and generally indicated by the reference numeral 60. Apparatus 60 includes five identical sections 60A-60E which are built up on a supporting transparent substrate 61 that also acts as an insulator. Additional insulators 65 are formed between the sections 60A–60E, as well as an insulator 65' located on the end of section 60E.

Figure 12:
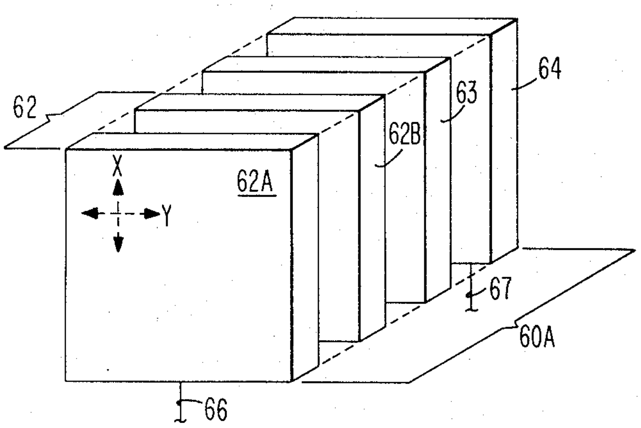
FIG. 12 is an exploded perspective view of a section of the embodiment of FIG. 11.

For sake of clarity, only section 60A is described in detail with reference to its perspective exploded view of FIG. 12. It should be understood, the other sections 60B–60E are configured identical to section 60A. Briefly, section 60A comprises a ferroelectric member 63 interleaved between a pair of transparent conductive member means 62 and 64. One of the pair, namely, conductive member means 62, is comprised of a transparent conductive layer 62A and a layer having a light responsive impedance such as a photoconductive layer 62B. The other one of the pair, namely, conductive member means 64, is a single transparent conductive layer. Layers 62A and 64 act as electrode contacts. Alternatively, as will be apparent to those skilled in the art from the description hereinafter, the photoconductive layer 62B may be disposed on the other sides of the layer 63, that is, between layers 63 and 64.

The electrode contacts, i.e., layers 62A and 64, of sections 60A–60E are connected to respective ones of conductive leads 66–75, FIG. 11, which in turn are connected to selective energizing circuitry, not shown, of an associated optical memory system, not shown, of which apparatus 60 is a component. Such a system is described in the aforementioned co-pending application. For sake of clarity, the corresponding elements of the ferroelectric optical storage apparatus component shown and described in the aforementioned co-pending patent application are provided with identical reference characters as those used herein for the apparatus 60 of FIGS. 11–12 of the present application.

The insulator 65' also acts as an analyzer for the polarized collimated light beam L which scans means 60. Alternatively, the domain of the layers 63 may be poled electrostatically during their formation so that layers 63 co-act with the polarized light beam L so as to collectively act as an analyzer.

In operation, the storage apparatus 60 co-acts with a collimated polarized light beam indicated by the arrow L. The beam is adapted to scan the storage locations associated with the apparatus 60 in a predetermined scan pattern such as, for example, an X-Y or raster type scan, cf. FIG. 12. Bipolar multi-level energizing means, not shown, are connected across conductors 66, 67. By judiciously selecting the polarity and voltage levels writing and erasing operations are performed when the particular storage location region is illuminated by the light beam L. Thus, the information is stored three-dimensionally, that is, spatially in the X and Y direction and by a multi-level color code in the Z direction. For example, let it be assumed for sake of explanation, each ferroelectric layer 63 is capable of being selectively energized by a energization pulse of levels write W2 or W3. When the particular energization pulse is removed, the particular storage region of the particular ferroelectric layer 63 is set to one of three residual or remnant birefringent level $\overline{\Delta n}1$, $\overline{\Delta n}2$ or $\overline{\Delta n}3$ corresponding to the levels W1, W2, W3. To erase, the residual birefringent levels $\overline{\Delta n}1$, $\overline{\Delta n}2$, or $\overline{\Delta n}3$ are reduced to a zero level by applying an appropriate opposite polarity erase energization pulse of level E1, E2, or E3, respectively, while the storage location is being coincidently scanned by beam L. Reading the storage location is accomplished by illuminating the particular storage location with the light beam L and detecting the spectral content of the light. Thus, each storage location is capable of selectively storing any one of the equivalent decimal number 0 to 15 for the given example of three storage levels and five sections.

In each section 60A–60E, only the impedance of the illuminated region of its particular layer 62B drops to a low value. This allows the energization level, if present across its electrode layers 62A and 64 to be directly applied across the corresponding illuminated region of its particular layer 63.

For a further detailed description of the apparatus of FIG. 11 and other contemplated modes of operation thereof, reference should be made to the aforementioned co-pending application, which is incorporated herein by reference.

While the invention has been particularly shown and described with reference to preferred embodiments, it will be understood by those skilled in the art that the foregoing and other changes in form and detail may be made therein without departing from the scope of the invention.

We claim:

1. Ferroelectric optical apparatus adapted to transmit incident polarized light therethrough in a given direction, said apparatus comprising:

a plurality of superimposed ferroelectric layers, each of said ferroelectric layers having first and second planar opposing sides transverse to said direction, at least one conductive member means disposed on each said first and second sides of each said ferroelectric layer, and means coupled to said conductive member means for selectively energizing said ferroelectric layers to provide said apparatus with a selectable and variable spectral bandpass characteristic.

2. Apparatus according to claim 1 wherein at least two adjacent ones of said plural ferroelectric layers have commonly disposed therebetween one of said conductive member means.

3. Apparatus according to claim 1 wherein at least two adjacent ones of said plural ferroelectric layers have two of said conductive member means disposed therebetween, said apparatus further comprising at least one insulator member means disposed between the last mentioned said two conductive member means.

4. Light filter apparatus adapted to transmit incident polarized light therethrough in a given direction, said apparatus comprising:

a plurality of superimposed ferroelectric layers, each of said ferroelectric layers having first and second planar opposing sides transverse to said direction, at least one conductive member means disposed on each said first and second sides of each said ferroelectric layer, polarizer means, analyzer means, said conductive member means and said ferroelectric layers being disposed between said polarizer and analyzer means, and means coupled to said conductive member means for selectively energizing said ferroelectric layers to provide said filter apparatus with a selectable and variable spectral bandpass characteristic.

5. Ferroelectric optical storage apparatus having plural storage locations adapted to transmit an incident polarized scanning light beam therethrough in a given direction, said apparatus comprising:

a plurality of first and second spaced conductive member means, a plurality of superimposed ferroelectric layers, each of said ferroelectric layers having first and second planar opposing sides transverse to said direction, a mutually exclusive one of said first conductive member means and a mutually exclusive one of said second conductive member means being disposed on said first and second sides, respectively, of each said layer, said first conductive member means further including a first conductive member and a light responsive second conductive member, and means coupled to said conductive member means for selectively energizing said ferroelectric layers to provide said apparatus with a selectable and variable spectral bandpass characteristic representative of the digital information to be stored in each of said locations of said apparatus.

6. Ferroelectric optical apparatus adapted to transmit incident polarized light therethrough in a given direction, said apparatus comprising:

a plurality of sections, each of said sections comprising first and second conductive layer means, and a ferroelectric third layer having first and second planar opposing sides transverse to said direction and being disposed adjacent to said first and second layer means, respectively, plural insulator members, a mutually-exclusive one of said plural insulator members being disposed between each of said sections, and means coupled to said first and second conductive layer means for selectively energizing said ferroelectric third layers to provide said apparatus with a selectable and variable spectral bandpass characteristic.

7. Light filter apparatus adapted to transmit incident polarized light therethrough in a given direction, said apparatus comprising:

a plurality of sections, each of said sections comprising first and second conductive layers, and a ferroelectric third layer having first and second planar opposing sides transverse to said direction and being disposed adjacent to said first and second layers, respectively, plural insulator members, a mutually-exclusive one of said plural insulator members being disposed between each of said sections, a polarizer and an analyzer with said sections being disposed therebetween, and means coupled to said first and second conductive layers for selectively energizing said ferroelectric third layers to provide said apparatus with a selectable and variable spectral bandpass characteristic.

8. Ferroelectric optical storage apparatus having plural storage locations adapted to transmit an incident polarized scanning light beam therethrough in a given direction, said storage apparatus comprising:

a plurality of sections, each of said sections comprising in sequence first, second and third conductive layers, and a ferroelectric fourth layer having first and second planar opposing sides transverse to said direction and being disposed adjacent to said second and third layers, respectively, said second layer being of the photoconductive type, plural insulator members, a mutually exclusive one of said plural insulator members being disposed between each of said sections, and means coupled to said first and third conductive layers for selectively energizing said ferroelectric fourth layers to provide said apparatus with a selectable and variable spectral bandpass characteristic representative of the digital information to be stored in each of said locations of said apparatus.

* * * * *